(12) United States Patent
Wang

(10) Patent No.: US 8,484,835 B2
(45) Date of Patent: Jul. 16, 2013

(54) DISMOUNTING JIG

(75) Inventor: Chin-Chou Wang, Tu-Cheng (TW)

(73) Assignee: Cheng Uei Precision Industry Co., Ltd., Tu-Cheng, Taipei Hsien (TW)

( * ) Notice: Subject to any disclaimer, the term of this patent is extended or adjusted under 35 U.S.C. 154(b) by 878 days.

(21) Appl. No.: 12/642,808

(22) Filed: Dec. 19, 2009

(65) Prior Publication Data

US 2011/0148129 A1    Jun. 23, 2011

(51) Int. Cl.
*B25B 27/02*    (2006.01)

(52) U.S. Cl.
USPC ................ 29/764; 29/739; 29/758; 29/283; 29/750

(58) Field of Classification Search
USPC ............... 29/278, 203, 427, 750, 758, 764, 29/739, 740, 741, 283
See application file for complete search history.

(56) References Cited

U.S. PATENT DOCUMENTS

| | | | |
|---|---|---|---|
| 3,974,556 A * | 8/1976 | Kubik | 29/764 |
| 4,389,912 A * | 6/1983 | Dallons et al. | 81/320 |
| 7,394,343 B2 * | 7/2008 | Cheng et al. | 337/265 |
| 8,286,317 B2 * | 10/2012 | Wang | 29/283 |

* cited by examiner

*Primary Examiner* — Peter DungBa Vo
*Assistant Examiner* — Kaying Kue
(74) *Attorney, Agent, or Firm* — Cheng-Ju Chiang

(57) ABSTRACT

A dismounting jig adapted for removing a metal shield which is coupled with a lens module and has two projections at two opposite sides thereof. The dismounting jig has a main body and two clutching arms. Each of the clutching arms has a fixing plate and a holding portion connected with the fixing plate. A lower portion of the holding portion has a buckling slice protruded inward. Two opposite sides of the holding portion extend perpendicularly to form a pair of opposite stabilizing wings locating at a same side as the buckling slice with respect to the holding portion. The clutching arms are symmetrically mounted on the main body by the fixing plates thereof fixed on two opposite sides of the main body. A receiving space is formed among the two pairs of the stabilizing wings and the holding portions.

5 Claims, 4 Drawing Sheets

DISMOUNTING JIG

BACKGROUND OF THE INVENTION

1. Field of the Invention

The invention relates to a dismounting jig, and more particularly to a dismounting jig for conveniently removing a metal shield from a lens module.

2. The Related Art

Please refer to FIG. 3, a lens module 6 includes a lens socket 60 and a lens component 70 mounted into the lens socket 60. A metal shield 80 is provided to enclose the lens module 6 to fix the lens component 70 firmly in the lens socket 60, moreover, to protect the lens module 6 from ambient electromagnetic interference and dust. Two opposite sides of the metal shield 80 have portions protruded outwards to form two projections 81 for abutting against a jig device to remove the metal shield 80 from the lens module 6, before the lens component 70 is separated from the lens socket 60. However, the metal shield 80 is apt to be damaged and disfigured when the metal shield 80 is dismounted from the lens module 6, because a force given to the metal shield 80 by the conventional jig device is usually unbalanced. Therefore, it is desirable to design a dismounting jig which has a simple structure and is capable of solving the problem mentioned above.

SUMMARY OF THE INVENTION

An object of the present invention is to provide a dismounting jig adapted for removing a metal shield which is coupled with a lens module and has two projections at two opposite sides thereof. The dismounting jig has a main body and two clutching arms mounted on the main body. Each of the clutching arms has a fixing plate and a holding portion connected with the fixing plate. A lower portion of the holding portion has a buckling slice protruded inward. Two opposite sides of the holding portion extend perpendicularly to form a pair of opposite stabilizing wings locating at a same side as the buckling slice with respect to the holding portion. The clutching arms are symmetrically mounted on the main body by the fixing plates thereof fixed on two opposite sides of the main body. The holding portions face to and space away from each other under the main body. A receiving space is formed among the holding portions and the stabilizing wings. The buckling slices buckle with the projections of the metal shield and the stabilizing wings lean against the opposite sides of the metal shield, when the lens module is received in the receiving space and the clutching arms are urged to approach each other and pulled upwardly to remove the metal shield from the lens module.

As described above, the stabilizing wings can lean against two opposite sides of the metal shield in progress of removing the metal shield from the lens module, which makes the metal shield keep balance and firm in the receiving space of the dismounting jig to protect the metal shield from damaging and disfiguring. So the dismounting jig is excellent and can be used widely.

BRIEF DESCRIPTION OF THE DRAWINGS

The present invention will be apparent to those skilled in the art by reading the following description of an embodiment thereof, with reference to the attached drawings, in which.

DETAILED DESCRIPTION OF THE PREFERRED EMBODIMENT

Figure 1:
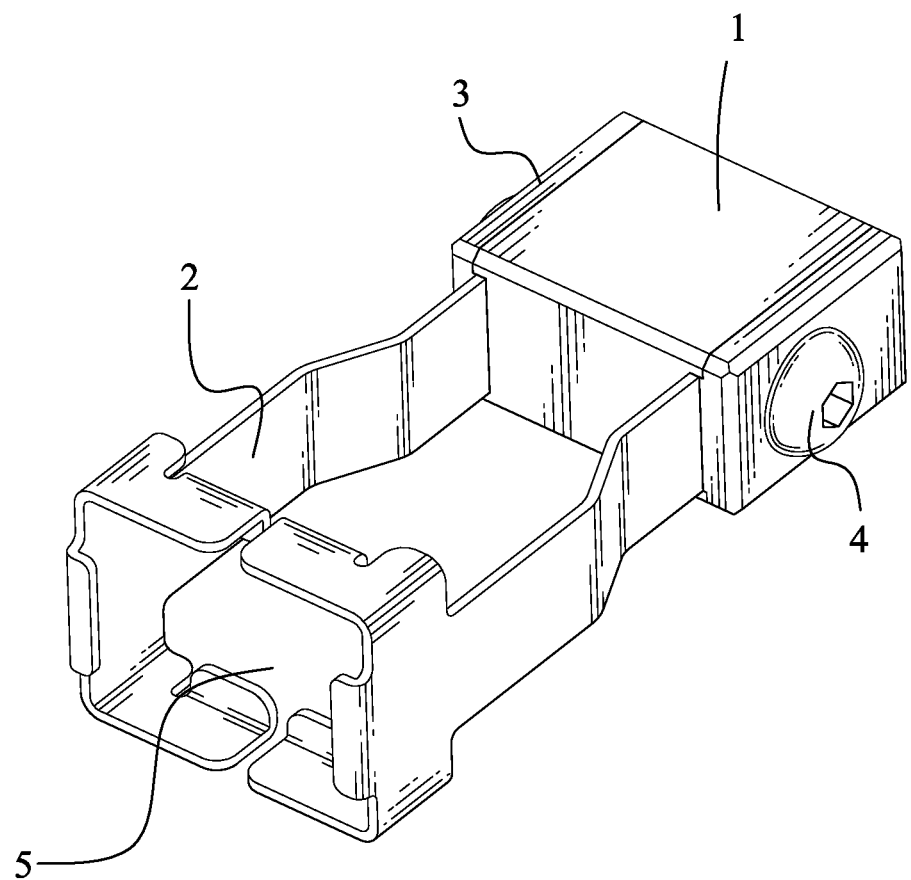
FIG. 1 is a perspective view of a dismounting jig according to the present invention.
Figure 2:
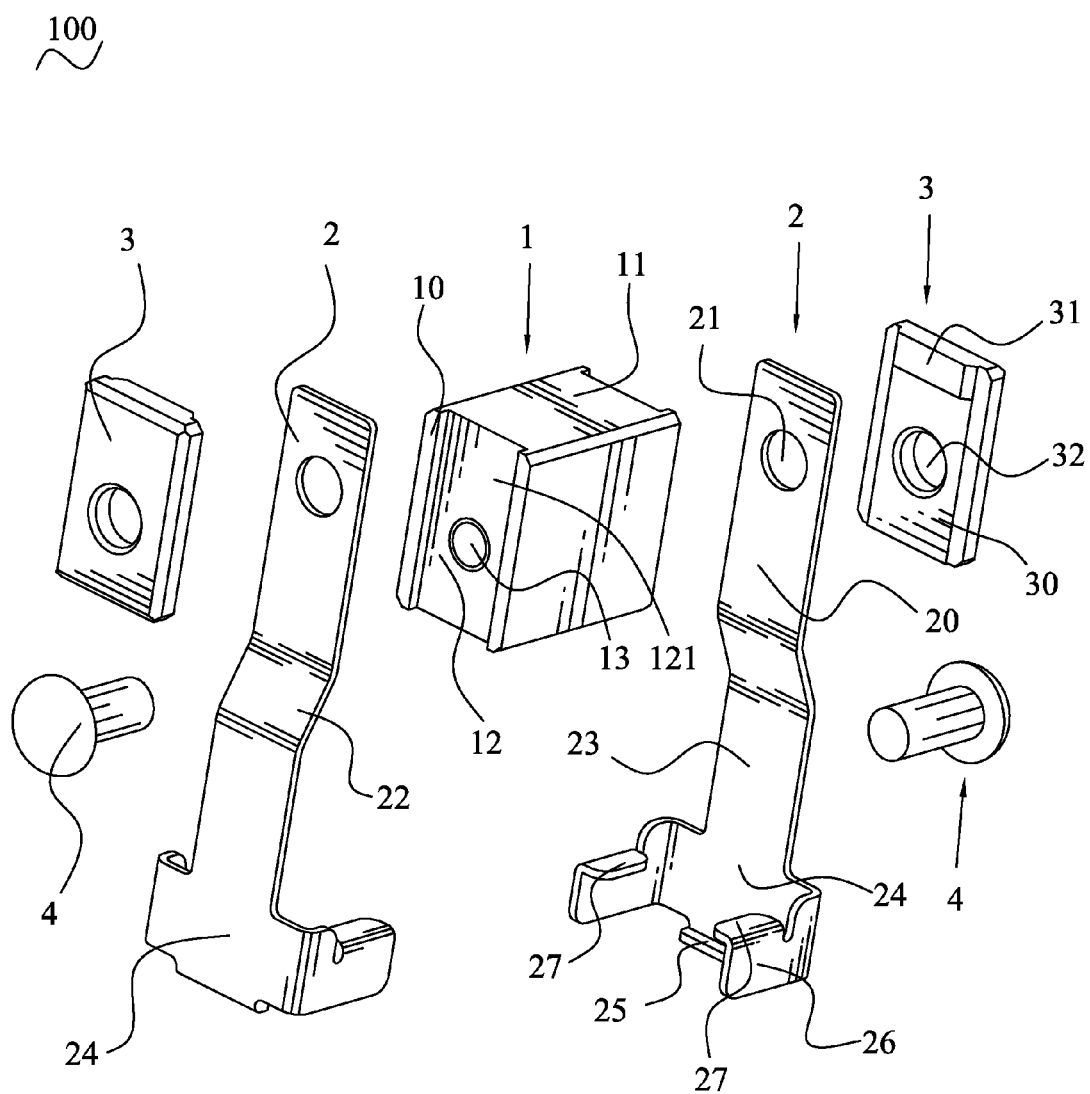
FIG. 2 is an exploded view of the dismounting jig shown in FIG. 1.
Figure 3:
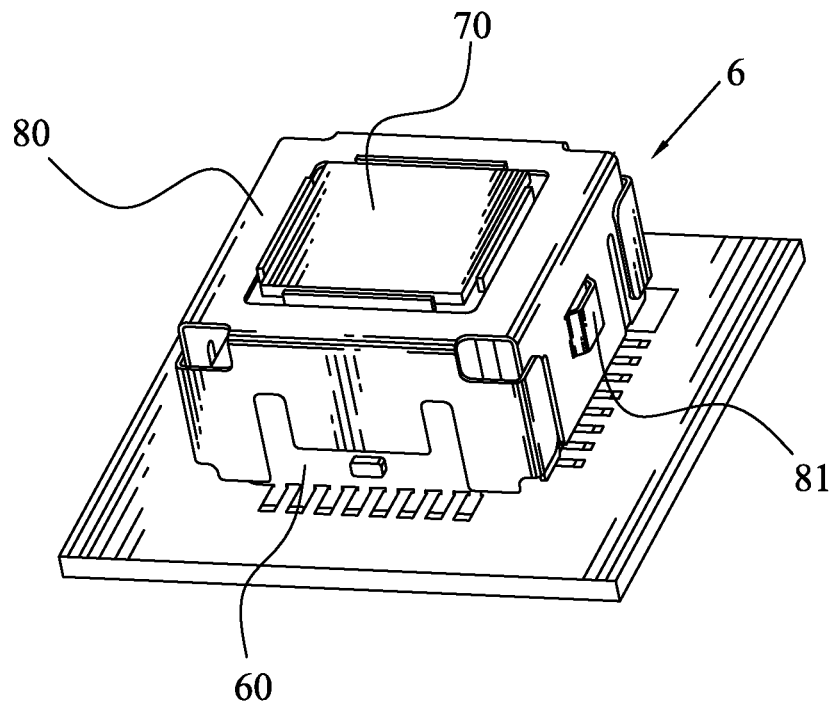
FIG. 3 is a perspective view of a conventional lens module.

Please refer to FIG. 1 and FIG. 2, a dismounting jig 100 according to the present invention is shown. The dismounting jig 100 includes a main body 1, a pair of clutching arms 2 mounted to the main body 1, a couple of fixing blocks 3 and two screws 4.

Please refer to FIG. 2, the main body 1 is a rectangular block shape and defines two opposite lateral surfaces 10 and a top surface 11 contiguous to the two lateral surfaces 10. Each of the lateral surfaces 10 is formed with a rectangular fixing recess 12 reaching the top surface 11 and the bottom surface of the main body 1. Each fixing recess 12 defines a mating surface 121. Each of the mating surfaces 121 has a portion formed with a positioning hole 13.

The two clutching arms 2 are the same in structures, here just taking one to describe. The clutching arm 2 has a rectangular fixing plate 20 received in the fixing recess 12 of the main body 1. The fixing plate 20 is formed with a fixing hole 21 passing therethrough corresponding to the positioning hole 13 of the fixing recess 12. A bottom end of the fixing plate 20 extends downwards and inclines outwards to form a connecting portion 22. The connecting portion 22 has a bottom end extended uprightly downwards to form a rectangular extending portion 23. A rectangular holding portion 24 intersects with the extending portion 23 by a middle portion of one long side thereof connecting with a bottom end of the extending portion 23 to show T-shape. The other long side of the holding portion 24 has a portion extended inwards opposite to the connecting portion 22 to form a buckling slice 25 which is perpendicular to the holding portion 24. The holding portion 24 has two opposite stabilizing wings 26. The stabilizing wings 26 are extended perpendicularly from two opposite sides of the holding portion 24, locating at a same side as the buckling slice 25 with respect to the holding portion 24. Two spaced abutting slices 27 are extended perpendicularly towards each other from portions of top edges of the stabilizing wings 26 away from the holding portions 24.

Each of the fixing blocks 3 is a rectangular shape and has an inner surface 30. The fixing plate 20 is disposed between the inner surface 30 and the mating surface 121 of the main body 1, in assembly. The inner surface 30 has a stopping rib 31 protruded inwards from an upper side thereof for abutting against a top end of the fixing plate 20, and an inserting hole 32 corresponding to the fixing hole 21 of the fixing plate 20.

With reference to FIGS. 1-2, in assembly, the two fixing plats 20 of the clutching arms 2 are received in the respective fixing recesses 12 of the main body 1, with the top ends thereof resting against the stopping ribs 31 of the fixing blocks 3 coupled with the two lateral surfaces 10 of the main body 1. The screws 4 pass through the respective inserting holes 33, the fixing holes 21 and the positioning holes 13 to make the clutching arms 2 and the fixing blocks 3 be symmetrically mounted on the main body 1. The corresponding connecting portions 22, the extending portions 23, the holding portions 24 and the stabilizing wings 26 of the two clutching arms 2 face to and space away from each other under the main body 1. A receiving space 5 for receiving the lens module 6 therein is defined among the two holding portions 24 and the two pairs of the stabilizing wings 26, after assembly.

Figure 4:
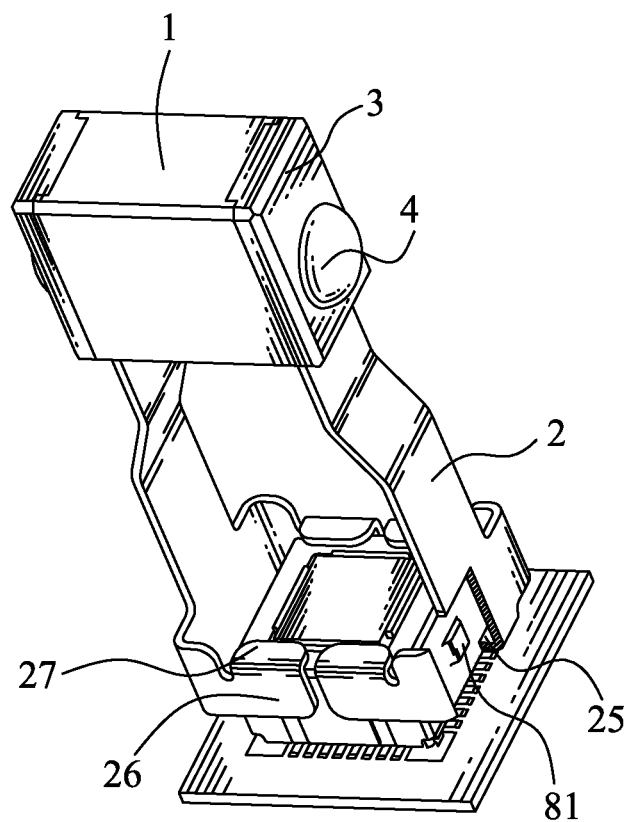
FIG. 4 is a perspective view showing a state that the lens module shown in FIG. 3 is clutched by the dismounting jig shown in FIG. 1, in order to show the working relation therebetween, a metal shield of the lens module is cut partially.

Referring to FIG. 4, in use, when the lens module 6 is received in the receiving space 5 of the dismounting jig 1, the stabilizing wings 26 lean against two opposite sides of the metal shield 80, and the abutting slices 27 abut on top edges of the metal shield 80. The clutching arms 2 are gripped to approach each other and pulled upwardly to make the buckling slices 25 buckle with the projections 81 of the metal shield 80. At this time, as the dismounting jig 1 continues to be pulled upwardly with the metal shield 80, the metal shield 80 is removed from the lens module 6.

As describe above, the stabilizing wings 26 can lean against two opposite sides of the metal shield 80 in progress of removing the metal shield 80 from the lens module 6, which makes the metal shield 80 keep balance and firm in the receiving space 5 of the dismounting jig 1 to protect the metal shield 80 from damaging and disfiguring. So the dismounting jig 1 is excellent and can be used widely.

Furthermore, the present invention is not limited to the embodiment described above; various additions, alterations and the like may be made within the scope of the present invention by a person skilled in the art. For example, respective embodiments may be appropriately combined.

What is claimed is:

1. A dismounting jig adapted for removing a metal shield which is coupled with a lens module and has two projections at two opposite sides thereof, comprising:
   a main body; and
   two clutching arms, each of the clutching arms having a fixing plate and a holding portion connected with the fixing plate, a lower portion of the holding portion having a buckling slice protruded inward, two opposite sides of the holding portion extending perpendicularly to form a pair of opposite stabilizing wings located at a same side as the buckling slice with respect to the holding portion;
   wherein the clutching arms are symmetrically mounted on the main body by the fixing plates thereof fixed on two opposite sides of the main body, the holding portions facing to and spacing away from each other under the main body, a receiving space being formed among the holding portions and the two pairs of the stabilizing wings, the stabilizing wings lean against opposite sides of the metal shield and the buckling slices buckle with the projections of the metal shield, when the lens module is received in the receiving space and the clutching arms are urged to approach each other and pulled upwardly to remove the metal shield from the lens module, each of the fixing plates has a bottom end extended downwards and inclined outwards to form a connecting portion, a bottom end of the connecting portion is extended downwards to form an extending portion, the holding portion intersects with the extending portion by a middle portion of a long side thereof connecting with a bottom end of the extending portion to show T-shape.

2. The dismounting jig as claimed in claim 1, further comprising a pair of fixing blocks disposed at the two opposite sides of the main body, each of the fixing plates being sandwiched between the corresponding fixing block and main body.

3. The dismounting jig as claimed in claim 2, wherein the main body, the fixing plates and the fixing blocks are formed with positioning holes, fixing holes and inserting holes, respectively, two screws are provided for passing through the respective positioning holes, the fixing holes and the inserting holes to fix the fixing plates, the fixing blocks and the main body together.

4. The dismounting jig as claimed in claim 2, wherein each of the pair of fixing blocks has a stopping rib at an upper portion of a side thereof for retraining against a top end of the fixing plate.

5. A dismounting jig adapted for removing a metal shield which is coupled with a lens module and has two projections at two opposite sides thereof, comprising:
   a main body; and
   two clutching arms, each of the clutching arms having a fixing plate and a holding portion connected with the fixing plate, a lower portion of the holding portion having a buckling slice protruded inward, two opposite sides of the holding portion extending perpendicularly to form a pair of opposite stabilizing wings located at a same side as the buckling slice with respect to the holding portion;
   wherein the clutching arms are symmetrically mounted on the main body by the fixing plates thereof fixed on two opposite sides of the main body, the holding portions facing to and spacing away from each other under the main body, a receiving space being formed among the holding portions and the two pairs of the stabilizing wings, the stabilizing wings lean against opposite sides of the metal shield and the buckling slices buckle with the projections of the metal shield, when the lens module is received in the receiving space and the clutching arms are urged to approach each other and pulled upwardly to remove the metal shield from the lens module, the portions of upper sides of the opposite stabilizing wings are extended towards each other to form a pair of abutting slices for abutting against a top edge of the metal shield.

* * * * *